Feb. 23, 1971   M. SORKIN   3,566,404
VEHICLE COLLISION AVOIDANCE SYSTEM
Filed Dec. 16, 1968
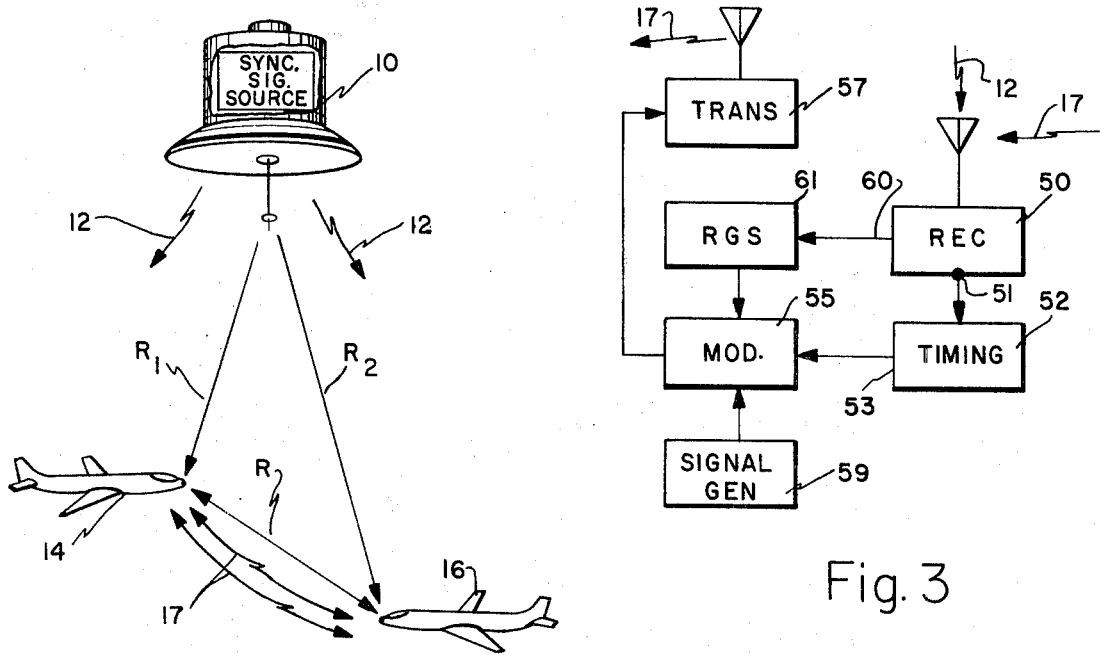
Fig. 3
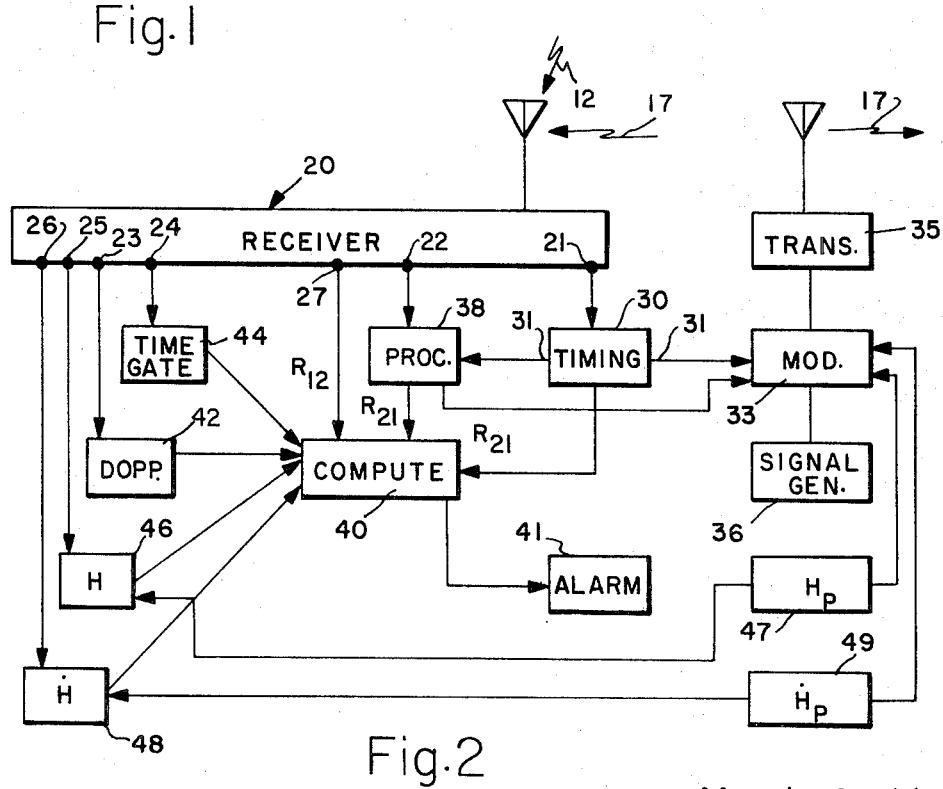
Fig. 1
Fig. 2
Morris Sorkin
INVENTOR.
BY *William B. Leach*
ATTORNEY ововар
United States Patent Office 3,566,404
Patented Feb. 23, 1971

3,566,404
VEHICLE COLLISION AVOIDANCE SYSTEM
Morris Sorkin, Santa Monica, Calif., assignor to TRW Inc., Redondo Beach, Calif., a corporation of Ohio
Filed Dec. 16, 1968, Ser. No. 783,994
Int. Cl. G01s 9/04, 9/56
U.S. Cl. 343—6.5       14 Claims

ABSTRACT OF THE DISCLOSURE

A method of an apparatus for avoiding collisions between vehicles, particularly suited for the control of aircraft, utilizing time sharing techniques and being synchronized by satellite emitted signals. Each satellite signal initiates a time cycle which in turn is divided into a number of time slots. Each aircraft is assigned a time slot during which it may transmit intelligence, including a reference signal. Inteligence is collected during all other times. Each aircraft, having a common time scale with all other aircraft, measures the transmission time of each received reference signal. The transmission time is directly proportional to the distance between the aircraft providing knowledge upon which evasive maneuver may be based. Since the various aircraft will be at differing distances from the satellite, some error will be present in the measured distance between aircraft. Correction is accomplished by transmitting the measured range to the other aircraft. Thus, each has available the distance between aircraft as measured at each aircraft. The average of the two measured ranges is computed and yields the actual range. A time gate is also provided for excluding the reference signal from aircraft which clearly provide no danger to the aircraft in question.

BACKGROUND OF THE INVENTION

This invention relates generally to collision avoidance systems for vehicles. It is particularly suited for the control of aircraft.

Both commercial and private aircraft operations are considered to be relatively free of accidents. Mid-air collisions between aircraft seldom occur. However, when such collisions do happen, the attended cost, both tangible and intangible, are extremely high. The prevention of aircraft collisions has therefore received much attention.

The Air Transport Association has adopted the position that a collision avoidance system should utilize time sharing techniques. Time sharing herein refers to the division of an operating cycle into a large number of time slots which may be of about two milliseconds duration. Each aircraft in the system is assigned an exclusive time slot in which it may broadcast or transmit intelligence. Each aircraft receives, or is prepared to receive, intelligence during all other times. Each aircraft in the system has a timing system which is synchronized with the timing system of all other aircrafts. Several time sharing systems have been proposed.

One such system proposes to maintain synchronization between aircraft by using ultra-stable atomic clocks to produce the time slots. However, some drift does occur, so that over a period of time, such as days, excessive timing error would occur. Facilities for checking and re-synchronizing must be provided. Such a system would include precise time synchronization of the atomic clocks located at each airport.

Another time sharing system which has been devised provides time slots which are derived from an ordinary crystal oscillator. The use of the crystal oscillator is much less expensive than the use of an atomic clock. The crystal oscillator timing system is re-synchronized in flight every two seconds by a two way exchange of intelligence between a ground station and the aircraft. In order to provide service over a large area, many ground stations must be provided, and, the ground stations themselves must be synchronized. In order to provide service over oceans ship stations may substitute for the ground station.

The disadvantages of the former approach are high cost, large size, large weight and necessity for daily re-calibration of the atomic clocks to eliminate long term drift. The latter is less costly, smaller, lighter, and provides continuous calibration.

It is however costly to install, operate, and maintain the network of ground stations. It is also difficult and costly to provide continuous coverage over oceans.

It is accordingly an object of the present invention to provide a vehicle collision avoidance system.

Another object of the present invention is to provide an aircraft collision avoidance system which does not require the use of an accurate clock.

A further object of the present invention is to provide an aircraft collision avoidance system that does not require a network of ground stations.

It is still another object of the present invention to provide an aircraft collision avoidance system utilizing time sharing techniques wherein the means for synchronizing the time scale of the various aircrafts is a non-cooperative component.

SUMMARY OF THE INVENTION

A system for avoiding collisions between vehicles having means for synchronizing the time scales of each vehicle comprising a source having means for transmitting a repetitive signal. The source is preferably an orbiting satellite. Each vehicle in the system has a timing subsystem which is synchronized by the satellite signal with all other vehicles in its vicinity so that their time slots essentially coincide. Each vehicle transmits a reference signal in an exclusive, assigned time slot, and listens in all other time slots. The time delay between the start of a time slot and the received reference signal in that slot is a measure of the one way range to the other aircraft.

Each vehicle is equipped with electronic circuitry for exchanging collision data with other vehicles. This circuitry includes a timing device for deceiving the periodic synchronization signals from the satellite and for developing a periodic operating cycle comprised of time increments or time slots. Each vehicle is assigned an exclusive time slot during which it may transmit information. Each circuitry further includes a transmitter and a modulator designed to condition intelligence input signals for transmission to other vehicles. A signal generator develops a reference signal for transmission in the exclusive time slot which may be received and used by other vehicles to determine the distance or one way range between the vehicles.

The foregoing and other objects of the present invention will become more and better understood when taken in conjunction with the following description and accompanying drawings, throughout which like characters indicate like parts and which drawings form a part of this application.

BRIEF DESCRIPTION OF THE DRAWINGS

FIG. 1 schematically represents aircraft utilizing a collision avoidance system embodying the principles of the present invention;

FIG. 2 schematically illustrates a block diagram of electronic circuitry suitable for air carriers, and embodying the present invention; and FIG. 3 schematically illustrates a block diagram of electronic circuitry suitable for small aircraft.

DESCRIPTION OF THE PREFERRED EMBODIMENT

Referring now to the drawings there is illustrated in FIG. 1 a satellite 10 from which there radiates a synchronizing signal 12 for reception by aircraft. Objects 14 and 16 represent two aircraft subject to the collision avoidance system. Each aircraft 14, 16 receives the repetitive synchronizing signal 12. The repetitive synchronizing signal defines time cycles common to all aircraft in the system. Each aircraft then divides each time cycle into a predetermined number of time slots. Alternatively, the function of dividing each time cycle into time slots may be performed by satellite system. The aircraft in that case simply selects an assigned time slot. Each aircraft is also assigned to an exclusive time slot. Each aircraft may transmit intelligence during its assigned time slots and receive, or be prepared to receive, intelligence during all other time slots. The time delay between the start of a time slot and a reference signal contained in the received intelligence in that time slot is a measure of the one way range to the other aircraft. This measured range may be corrected as explained below for error due to differing distances to the source of the synchronization signal and bias in the electronic circuitry.

The synchronization signal may typically be produced every two seconds. Each aircraft may typically divide the two second cycles into time slots of two millisecond duration. This would permit the assignment of one thousand aircraft to an exclusive time slot.

Turning to FIG. 2, there is represented in block diagram form, the equipment carried aboard each of two different aircraft. For purposes of initial discussion herein, the application of the collision avoidance system to commercial air carriers will first be discussed. Therefore, both the aircrafts under consideration will be equipped as shown in FIG. 2.

As stated above, each aircraft is to measure the propagation time of a reference signal 17 emitted by another aircraft. It will be apparent that the measured range will be in error unless both aircraft are the same distance from the satellite. In other words, if the aircraft are at different distances from the satellite, one aircraft will receive the synchronizing signal 12 at a time later than the other aircraft and will have slightly off set time scales. The present invention overcomes this error. Since the aircraft all use a common synchronization signal, the indicated measured range from aircraft 1 to aircraft 2 ($R_{12}$) will be in error due to the difference in range from the satellite to aircraft No. 1 ($R_1$) and the range from the satellite to aircraft No. 2 ($R_2$). Thus, the indicated measured range from aircraft 1 to aircraft 2 is expressed $R_{12}=R+R_2-R_1$ while from aircraft No. 2 to aircraft No. 1 the indicated measured range $R_{21}=R+R_1-R_2$. Each aircraft not only makes the indicated range measurement but also transmits it to the other aircraft. Thus, each aircraft has available both $R_{12}$ and $R_{21}$. The actual range (R) is the average of the indicated ranges, e.g., $(R_{12}+R_{21})/2=R$.

Each aircraft not only makes the range measurements to all other aircraft within operation range, but also transmits their identifications and measured ranges. This may be accomplished by pulse code modulation of the transmitted signal. The same modulation technique may be used to transmit altitude and altitude rate information. If other data, such as heading, be deemed desirable, it may be added at no cost as a few more bits in the data word.

Referring to FIG. 2 and considering one aircraft to be the parent aircraft and another to be an intruder or hazard, the satellite emitted synchronizing signal 12 is detected and processed by a receiving means 20 aboard the parent aircraft. Receiving means 20 has an output 21 coupled to timing device 30. Output 21 is representative of the periodic synchronizing signal and provides cyclic time periods for the timing device 30.

Timing device 30 may consist of a conventional crystal oscillator driving a count down chain and being synchronized by the satellite emitted synchronizing signal. The outputs 31, 31 of timing device 30 are signals representative of the time cycles divided into a large number of time increments or time slots. By way of example, the time cycle may be two seconds divided into two milliseconds time slots. The timing device 30 further includes means for selectively identifying one of the time slots as the exclusive slot during which the parent aircraft will transmit its intelligence. Outputs of timing device 30 may be used to coordinate the functions of other devices in the aboard circuitry.

One of the outputs 31 of timing device 30 is coupled to modulator means 33. The function of modulator means 33 is, of course, to condition one or more intelligence bearing input signals for the transmission to other aircraft by transmitter 35.

One input to modulator means 33 is provided by signal generator 36. The output of signal generator 36 will, transmitted to another aircraft, be used by other aircraft to make an indicated range measurement. The generator signal may simply be a pulse which is transmitted in the exclusive time slot of the parent aircraft. Another aircraft may then measure the elapsed time from beginning of that time slot to the reception of the pulse signal. It is, however, preferable that the output of signal generator 36 be a burst or long pulse of continuous wave. This permits Doppler techniques to be used for determining the relative velocity of another aircraft. The frequency of the continuous wave output of signal generator 36 is common to all aircraft in the system. Therefore, an aircraft receiving a reference signal may compare the frequency thereof to the known continuous wave frequency to determine the relative velocity and whether or not the two aircrafts are approaching one another.

It is noted that the Doppler measuring frequency may be derived from synchronization signal. To this end phase lock loop circuitry may be utilized to phase lock the output of generator 36 to the phase of the carrier or subcarrier frequency of the signal transmitted from the synchronizing source.

An intelligence bearing signal 17 from the intruder aircraft is also received and processed by receiving means 20. Included in the intelligence signal 17 is the intruder aircraft's reference signal to be used for measuring indicated range. As stated above, this reference signal may be in the form of a pulse or may be the leading edge or other designated portion of a continuous wave burst. The reference signal is provided as an output 22 of receiving means 20 for coupling to processing means 38. Another input to processing means 38 is an output 31 from timing device 30.

The purpose of processing means 38 is to determine the propagation time of the reference signal received from the other aircraft. The measurement is the time delay between the beginning of the instant time slot and the arrival of the reference signal. The output of processing means 38 is representative of the indicated range from the second aircraft to the parent aircraft and is notated $R_{21}$. The subscripts indicate that the reference signal was emitted by aircraft No. 2 and measured at aircraft No. 1 or the parent aircraft. It may be noted that the measured time delay may include a bias due to time delays in the electronic circuitry. This may be removed by well known calibration techniques.

The output $R_{21}$ of processing means 38 is coupled to the modulator means 33. The indicated range $R_{21}$ is appropriately conditioned for transmission subsequent to the continuous wave reference signal. The modulated reference signal $R_{21}$ may include appropriate identification modulation associating the indicated range $R_{21}$ with a particular time slot. Therefore, the appropriate aircraft which emitted the reference signal in question also has the indicated range $R_{21}$ as derived from its emitted reference signal. It will be noted that the output of processing means 38, indicated range $R_{21}$, is also coupled to computer 40.

Computer 40 has a second input $R_{12}$ and represents the indicated range between the aircraft in question as measured by the second or intruder aircraft. This information is carried by the intelligence bearing signal 17 received and appropriately processed by receiving means 20 and appearing at output 27 and labeled $R_{12}$. It will be recalled that both aircraft in question have similar collision avoidance equipment. As explained above, a reference signal is generated and transmitted by the parent aircraft in its exclusive time slot. The transmission time of that signal is measured by the intruder aircraft to yield an indicated range from aircraft 1 to aircraft 2. The intruder aircraft transmits this indicated ange which is received by the parent aircraft and demodulated as indicated range $R_{12}$. Computer 40 thus has as inputs the time delay, consequently the range, as first measured from aircraft 2 to aircraft 1 and as measured from aircraft 1 to aircraft 2.

The computer then determines the average of the indicated ranges which is the true range. By means of the foregoing apparatus and operations the errors introduced by the differences in distance of each aircraft from the satellite is effectively eliminated.

The true range or distance between aircraft 1 and 2 may be directly displayed for observation and use by a crew member of the aircraft or to actuate an alarm system 41. Also, the computer may be designated to compute the range to range rate ratio. Computer logic means may be utilized to test the range to range rate ratio against minimum or hazardous values. If these results indicate the possibility of a collision, an output from computer 40 may actuate the alarm system 41, and indicate the proper maneuver to avoid the hazard. In a similar manner, relative altitude and relative autitude rate may be compared to minimum values.

Many refinements may be added to the system to reduce the signal and data processing by interrupting the signals from aircraft which do not pose a hazard to the parent aircraft. Attention hereinabove has also been directed to the use of Doppler measurements to eliminate processing those signals received from another aircraft which is not approaching the parent aircraft. To this end receiving means 20 develops an output 23 representative of the Doppler frequency. Output 23 is coupled to Doppler comparator 42 wherein the received frequency is compared to the frequency common to all aircraft generators. If the receive frequency is greater than the common or standard frequency, the distance between the aircraft in question is decreasing. The output of Doppler comparator 42 is of a description which will, when coupled to the computer 40, direct the computer to perform the appropriate range calculations. Similarly, aircraft beyond a selected range may be deemed nonhazardous to the parent aircraft and range calculations need not be performed. Since signal transmission time is directly indicative of range between aircraft, a time lapse following the commencement of each time slot may be determined which will be representative of the range which is considered hazardous. Thus, time gate or range gate 44 serves to accept those reference signals which arrive within the preselected time interval following the commencement of the instant time slot and serves to reject those signals arriving thereafter. Receiving means outputs 25 and 26 provide demodulated representations of altitude (H) and rate of change of altitude (H) received from another aircraft. This information is coupled to comparators 46, 48 for comparison to the altitude ($H_p$) and rate of change of altitude ($H_p$) of the parent aircraft. The latter inputs are derived from altitude devices 47, 49. The ratio of relative altitude to relatively altitude rate may be compared to some preselected minimum condition for safety. Thus, when all of the flight parameters under consideration each indicate a hazardous condition the output of computer 40 actuates an alarm system permitting the aircraft operator to take an indicated evasive action. Clearly then, when any one of the flight parameters show no possible collision, range data need not be stored in the computer memory or transmitted to another vehicle.

The foregoing described collision avoidance system provides a reasonably comprehensive data exchange system most suitable for commercial air carriers. While such a system would be desirable for general aviation purposes, the cost associated with a comprehensive system may be a deterrent to the use thereof by general aviation. In the aircraft circuitry of FIG. 3, there is shown a time sharing collision avoidance system wherein the emphasis is on minimizing the equipment for small aircraft. The system shown in FIG. 3 is suitable for minimizing the chance of collision between an air carrier equipped as in FIG. 2 and a small aircraft.

In order to effectively process data, the air carrier will have to recognize the small aircraft as such. This can be accomplished by reserving specified time slots to small aircraft.

The small aircraft may be equipped as in FIG. 3 with receiving means 50 for receiving the satellite synchronization signal 12 and for providing an output 51 representative thereof. Output 51 of receiving means 50 is coupled to timing device 52 which provides an output 53 representative of time cycles divided into multiple time slots. Timing device 52 is equipped with means for the aircraft operator to select one of the time slots for exclusive use.

As in the case of the air carrier, the small aircraft is equipped with modulating means 55, a transmitter 57, and signal generating means 59 which cooperate with one another and with timing device 52 to transmit a continuous wave burst in the exclusive time slot of the small aircraft. The continuous wave burst may be followed by other signals for information such as altitude information.

The air carrier, upon receiving the small aircraft transmission, measures the Doppler frequency and determines the small aircraft altitude, then computes the relative range, velocity, and altitude differential. If the Doppler frequency is negative the air carrier does nothing because the range is increasing. However, if the frequency is positive and the altitude differential is less than an allowed minimum the air carrier transmits a ranging signal in the small aircraft's time slot. When the ranging signal is received by the small aircraft in its own exclusive time slot a pilot warning indicator is actuated, alerting the pilot to the fact that another aircraft is approaching at close to the same altitude. The ranging signal, included in the intelligence bearing signal 17, is received by receiving means 50 and an output 60 is provided which is representative thereof. The output 60 activates a ranging signal generator 61, labeled RSG, having its output coupled to modulator means 55. By these means, the ranging signal transmitted by the air carrier is immediately retransmitted to the air carrier, where the two way time delay is measued, yielding the true range. Thus, the air carrier having the true range and range rate may compute the time to collision. If this time factor is more than a minimum allowed nothing need be done, but if it is less than the allowed minimum a pilot warning may be sounded. The air carrier may either maneuver itself to send a maneuver indicating signal to the other aircraft in the other aircraft's time slot.

A collision avoidance system of the type described wherein the synchronizing source, e.g., the satellite, performs the function of dividing each time cycle into a plurality of time increments or slots provides for the least complexity of equipment aboard the vehicle. In this case, the timing device 52 need only count down to the assigned time slot. The vehicle may carry only sufficient equipment to generate a reference signal in its assigned time slot and to measure propagation time of reference signals emitted by other aircraft. By adding equipment and complexity, varying degrees of improved collision avoidance is obtainable. The discussion herein has extensively discussed means for exchanging range information to eliminate error induced by differing distances of each vehicle from the synchronization source. The use of Doppler techniques has also been explained. Additional collision data may be obtained by utilizing known techniques and equipment to exchange operating parameters.

The satellite synchronized collision avoidance system disclosed herein has several advantages over atomic clock or ground station synchronized systems. One very important advantage is the wide area coverage over land and ocean. A single satellite in synchronous orbit over the Equator at 60° west could provide coverage over all of the United States and the Atlantic Ocean. Three satellites could provide almost complete earth coverage. The three satellites may be stationed in synchronous equatorial orbits, spaced 120° apart. Each satellite would cover about 165° of longitude at the Equator so that two satellites would be visible where the coverage is overlapped.

The three satellites could be time synchronized and the synchronization of an aircraft may be automatically switched from one satellite to another. On the other hand, the areas of overlapping satellite coverage may be positioned such that the switching from one satellite to another occurs at longitudes where collision hazard is minimum.

The collision avoidance system disclosed herein provides collision avoidance without a large network of ground stations which must be time synchronized and which would be costly to install and maintain.

Finally, there is no need for ultra stable clocks anywhere in the system disclosed because all aircraft use the same time synchronization signal and utilize a common Doppler measuring signal. Ordinary quartz crystal oscillators have sufficient stability for use as time sources for the satellite and aircraft timing systems.

What is claimed is:

1. A method for avoiding collision between two or more vehicles comprising the steps of:
    (a) transmitting a periodic timing signal for reception by each vehicle;
    (b) dividing each time cycle into a plurality of increments, each vehicle being assigned to a different and unique increment during which it may transmit intelligence;
    (c) transmitting a reference signal from each vehicle at a predetermined time in its designated time increment;
    (d) measuring the propagation time of said reference signal from one vehicle to another;
    (e) transmitting a signal representative of said measured propagation time from said another vehicle to said one vehicle;
    (f) measuring the propagation time of the reference signal from said another vehicle to said one vehicle;
    (g) and determining the average propagation time of said reference signals thereby to yield the range between said vehicles independent of the distance from the source of the periodic timing signal to each vehicle.

2. In a collision avoidance system of the type wherein repetitive time cycles are divided into time slots and each vehicle is assigned to a unique slot within which each vehicle transmits a reference signal and wherein each other vehicle measures the propagation time from transmission to reception to indicate the one way range to the transmitting vehicle, the improvement comprising:
    (a) a synchronizing signal source defining the beginning of each time cycle and serving as a common time scale for all vehicles;
    (b) signal transmitting means aboard each vehicle adapted for emitting a signal representative of the measured one way range; and
    (c) range determining means aboard each vehicle adapted for receiving said measured one way range from said another vehicle and being further adapted for computing the average of the range as measured on board the computing vehicle and the received measured one way range as computed on board the said other vehicle thereby to provide an actual range independent of the distance of each vehicle from the source of the synchronizing signal.

3. A vehicle collision avoidance system comprising:
    (a) a source adapted for emitting a periodic synchronizing signal;
    (b) means aboard each of two system vehicles for defining a like plurality of time increments intermediate each timing signal;
    (c) means aboard each of the vehicle coupled to said timing means for transmitting a first reference signal in the vehicle's designated time increment;
    (d) means aboard at least the first vehicle for determining the propagation time of the first reference signal from the second to the first vehicle based upon the initiation of the time increment and the reception of said reference signal from the second vehicle thereby providing a measure of the distance between vehicles;
    (e) means aboard the first vehicle for generating a second reference signal in the second vehicle's designated time increment;
    (f) means aboard the second vehicle for detecting said second reference signal and immediately transmitting a return signal; and
    (g) means aboard the first vehicle for measuring the total propagation time of said second reference signal and said return signal, and for determining the average thereof whereby the distance between the vehicles is derived.

4. A collision avoidance system for two or more vehicles comprising:
    (a) a synchronizing signal source positioned remote from each of the vehicles and adapted for emitting a synchronizing signal defining periodic time cycles;
    (b) a timing device associated with said synchronizing signal and adapted for dividing each said periodic time cycle into a predetermined number of unique time slots to which the vehicles may each be assigned;
    (c) reference signal means aboard each vehicle adapted for generating and transmitting an omnidirectional reference signal, said reference signal means having an input coupled to an output of said timing device and being further adapted for transmitting said reference signal in a preselected unique time slot;
    (d) range measuring means aboard each vehicle adapted for receiving an incoming reference signal generated and transmitted by another vehicle and being further adapted for determining the propagation time of said incoming reference signal, said range measuring means being coupled to said timing device and having an output signal representative of the propagation time thereby indicating a measured range, said output signal being impressed upon said reference signal means, and said reference signal means being further adapted to transmit a measured range signal in said assigned time slot; and
    (e) range determining means aboard each vehicle adapted for receiving a measured range signal from said another vehicle, said range determining means being coupled to said range measuring means and being further adapted to compute the average of the measured range and the received measured range, thereby determining the actual range between the vehicles, said actual range being insensitive to the variation in differences from each vehicle to the synchronizing signal source.

5. The collision avoidance system of claim 4 wherein said reference signal means includes:
    (a) a transmitter;
    (b) a modulator having the output thereof coupled to the input of said transmitter and having an input coupled to the output of said timing device and further being adapted for forming a modulated output signal in said preselected unique time slot; and (c) a signal generator having the output thereof coupled to the input of said modulator.

6. The collision avoidance system of claim 4 wherein said range measuring means includes:

(a) a receiver adapted for detecting said reference signal generated and transmitted by said another vehicle and for generating an output signal representative thereof; and (b) processing means having an input coupled to the output of said receiver and having another input coupled to the output of said timing device and adapted for generating an output signal representative of the indicated range from said another aircraft, said output of said processing means being coupled to an input of said reference signal means.

7. The collision avoidance system of claim 4 wherein said range determining means includes:

(a) a receiver adapted for detecting said measured range signal transmitted from said another vehicle and for producing an output signal representative thereof; and (b) a computer device having an input thereof coupled to the output of said receiver and having another input thereof coupled to the output of said range measuring means and adapted for producing an output signal representative of the average of said measured range signal transmitted from said another vehicle and the range represented by the output signal from said reference signal means, thereby providing the actual range to said another vehicle which is insensitive to the variation in distance from each vehicle to the synchronizing signal source.

8. The vehicle collision avoidance system of claim 4 further comprising:

gate circuitry means for interrupting the processing of the received reference signal when the time lapse following the reception of the synchronizing signal exceeds a predetermined value without there being a reception of a reference signal thereby not to analyze the collision potential of vehicles located more than a preselected distance away.

9. The vehicle collision avoidance system of claim 4 wherein said synchronizing signal source is carried aboard an orbiting satellite.

10. The collision avoidance system of claim 4 wherein said synchronizing signal is emitted at a predetermined frequency whereby said frequency may be used as the carrier frequency for the exchange of signals between vehicles, and whereby Doppler determinations may be made therefrom.

11. Collision avoidance apparatus for a vehicle of the type using a time scale system having time cycles divided into time slots by a timing device to one of which time slots the vehicle is assigned, the timing cycles being generated by a common source, the collision avoidance apparatus comprising:

(a) reference signal means adapted for generating and transmitting an omnidirectional signal in the assigned time slot, said reference signal means having an input for impressing thereon the synchronizing signal;

(b) range measuring means having an input for impressing said synchronizing signal thereon and adapted for receiving a reference signal generated and transmitted by another vehicle and further adapted for determining the propagation time of said received reference signal and for generating an output signal representative thereof; and (c) range determining means coupled to said range measuring means and adapted for receiving a measured range signal from said another vehicle and further coupled to said range measuring means and adapted for determining an average of the received measured range and the range as determined by said range measuring means, thereby to indicate the actual range from said vehicle to said another vehicle without being influenced by the variation in distance between said vehicle and the synchronizing signal source.

12. The collision avoidance apparatus of claim 11 wherein said reference signal means includes:

(a) a transmitter;

(b) a modulator having the output thereof coupled to the input of said transmitter and having an input coupled to the output of said timing device and further being adapted for forming a modulated output signal in said preselected unique time slot; and (c) a signal generator having the output thereof coupled to the input of said modulator.

13. The collision avoidance apparatus of claim 11 wherein said range measuring means includes:

(a) a receiver adapted for detecting said reference signal generated and transmitted by said another vehicle and for generating an output signal representative thereof; and (b) processing means having an input coupled to the output of said receiver and having another input coupled to the output of said timing device and adapted for generating an output signal representative of the indicated range from said another aircraft, said output of said processing means being coupled to an input of said reference signal means.

14. The collision avoidance apparatus of claim 11 wherein said range determining means includes:

(a) a receiver adapted for detecting said measured range signal transmitted from said another vehicle and for producing an output signal representative thereof; and (b) a computer device having an input thereof coupled to the output of said receiver and having another input thereof coupled to the output of said range measuring means and adapted for producing an output signal representative of the average of said measured range signal transmitted from said another vehicle and the range represented by the output signal from said reference signal means, thereby providing the actual range to said another vehicle which is insensitive to the variation in distance from each vehicle to the synchronizing signal source.

References Cited
UNITED STATES PATENTS

| | | | |
|---|---|---|---|
| 3,153,232 | 10/1964 | Fletcher et al. | 343—6.5X |
| 3,167,772 | 1/1965 | Bagnall, Jr. et al. | 343—6.5X |
| 3,208,064 | 9/1965 | Morrel. | |
| 3,336,591 | 8/1967 | Michnik et al. | 343—6.5 |
| 3,380,049 | 4/1968 | Webb | 343—6.5 |
| 3,418,579 | 12/1968 | Hultberg. | |
| 3,440,652 | 4/1969 | Bates et al. | 343—6.5X |

RODNEY D. BENNETT, JR., Primary Examiner

M. F. HUBLER, Assistant Examiner

U.S. Cl. X.R.

343—7.5, 12, 112